(12) United States Patent
Cho et al.

(10) Patent No.: US 8,737,305 B2
(45) Date of Patent: May 27, 2014

(54) METHOD FOR ALLOCATING RESOURCES IN BROADBAND WIRELESS ACCESS SYSTEM

(75) Inventors: Heejeong Cho, Anyang-si (KR); Giwon Park, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/457,016

(22) Filed: Apr. 26, 2012

(65) Prior Publication Data

US 2013/0077579 A1    Mar. 28, 2013

Related U.S. Application Data

(60) Provisional application No. 61/538,926, filed on Sep. 25, 2011, provisional application No. 61/544,259, filed on Oct. 6, 2011, provisional application No. 61/546,563, filed on Oct. 13, 2011, provisional application No. 61/577,090, filed on Dec. 19, 2011, provisional application No. 61/588,094, filed on Jan. 18, 2012.

(51) Int. Cl.
*H04W 4/00*    (2009.01)

(52) U.S. Cl.
USPC ........................................... 370/328

(58) Field of Classification Search
CPC ..... H04W 24/00; H04W 4/005; H04W 52/00; H04W 52/02; H04W 52/0206; H04W 52/0209; H04W 52/0216; H04W 52/0219; H04W 52/0225; H04W 76/04; H04W 84/12; H04W 84/14; H04W 72/04; H04W 76/043; H04W 40/05; H04B 7/26

USPC ................................ 370/310, 311, 328–350
See application file for complete search history.

(56) References Cited

U.S. PATENT DOCUMENTS

| | | | |
|---|---|---|---|
| 2012/0226930 A1* | 9/2012 | Colban et al. | 713/340 |
| 2013/0070674 A1* | 3/2013 | Lin et al. | 370/328 |
| 2013/0266000 A1* | 10/2013 | Tarradell | 370/338 |
| 2013/0315074 A1* | 11/2013 | Kim et al. | 370/242 |

FOREIGN PATENT DOCUMENTS

WO    WO 2010/101447 A2    9/2010

OTHER PUBLICATIONS

Jung et al, Abnormal power down reporting in WirelessMAN Air Interface for Broadband Wireless Access System, IEEE, 7 pages, Nov. 10, 2011.*

(Continued)

*Primary Examiner* — Frank Duong
(74) *Attorney, Agent, or Firm* — McKenna Long & Aldridge LLP

(57) ABSTRACT

A method and apparatus for efficiently allocating resources to a terminal in a random access system are provided. A method for transmitting an abnormal power down report from a Machine to Machine (M2M) device in a wireless communication system may include transmitting a Bandwidth Request (BR) preamble sequence and a first message to a base station, receiving an uplink resource allocation from the base station, transmitting the abnormal power down report using the uplink resource allocation, and starting a first timer for confirmation of the transmitted abnormal power down report, wherein the first message may include an identifier of the M2M device and a BR index for transmitting an abnormal power down report.

14 Claims, 10 Drawing Sheets

(56) References Cited

OTHER PUBLICATIONS

Yi-Ting Lin et al: "Abnormal Power Down Indication Through Quick Access Procedure", IEEE 802.16 Broadband Wireless Access Working Group <http://IEEE802.ORG/16>, Sep. 9, 2011, pp. 1-5, XP055054257.

IEEE: "WirelessMAN-Advanced Air Interface for Broadband Wireless Access Systems Enhancements to Support Machine-to-Machine Applications", IEEE 802.16P, Aug. 30, 2011, pp. 1-37, XP055054287.

IEEE: "WirelessMAN-Advanced Air Interface for Broadband Wireless Access Systems, Enhancements to Support Machine-to-Machine Applications", IEEE P802.16P, Oct. 1, 2011, pp. 1-63, XP055054111, IEEE P802.16p.

\* cited by examiner

METHOD FOR ALLOCATING RESOURCES IN BROADBAND WIRELESS ACCESS SYSTEM

This application claims the benefit of U.S. Patent Application No. 61/538,926, filed on Sep. 25, 2011, Application No. 61/544,259, filed on Oct. 6, 2011, Application No. 61/546,563, filed on Oct. 13, 2011, Application No. 61/577,090, filed on Dec. 19, 2011 and Application No. 61/588,094, filed on Jan. 18, 2012, which are hereby incorporated by reference as if fully set forth herein.

BACKGROUND OF THE INVENTION

1. Field of the Invention

The present invention relates to a broadband wireless access system, and more particularly, to a method and apparatus for efficiently allocating resources to a terminal in a random access system.

2. Discussion of the Related Art

First, a Machine to Machine (M2M) communication environment is briefly described.

The term "Machine to Machine (M2M) communication" refers to communication that is performed between electronic devices as the term states. Although, in a broad sense, the term "M2M communication" refers to wired or wireless communication between electronic devices or communication between a device that is controlled by a human and a machine, the term has generally been used recently to indicate wireless communication which is performed between electronic devices without humans being involved.

In the early 1990's when the M2M communication concept was introduced, M2M was considered a concept such as remote control or telematics and associated markets were greatly limited. However, in recent years, M2M communication has been continuously rapidly developed, creating a new market that is attracting global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring machines and facilities. In the future, M2M communication will be used for a wider variety of purposes, in combination with existing mobile communication and wireless high-speed Internet or low-power communication solutions such as Wi-Fi and ZigBee, will no longer be limited to the Business to Business (B2B) market and will expand its application field into a Business to Consumer (B2C) market.

In the M2M communication era, all machines equipped with a Subscriber Identity Module (SIM) card can transmit and receive data such that it is possible to remotely manage and control all such machines. For example, the application range of M2M communication technology is very broad such that M2M communication technology can be used for a great number of devices and equipment such as cars, trucks, trains, containers, vending machines, and gas tanks.

In the related art, terminals are generally managed on an individual basis and thus communication between a base station and a terminal is performed based on a one-to-one communication scheme. Assuming that a large number of M2M devices communicate with a base station through such a one-to-one communication scheme, network overload can be expected due to signaling generated between each M2M device and the base station. When M2M communication has rapidly spread in a broad range of applications as described above, there may be problems associated with overhead due to communication between M2M devices or between M2M devices and a base station.

In addition, in the M2M system, an abnormal power outage event associated with M2M devices may occur since humans are not involved in operation of M2M devices. When such an abnormal power outage event has occurred in an M2M device, a power outage event may occur in most M2M devices at a point to which the M2M device belongs.

When a power outage event has occurred, M2M devices need to report the power outage event to the base station. For example, M2M devices which are in an idle mode will perform a ranging procedure in order to report the power outage event. In this case, collision may occur between the M2M devices. In addition, M2M devices which are in a normal state will perform a bandwidth request procedure in order to report the power outage event. In this case, there is also a high probability that a collision occurs between the M2M devices.

When a collision has occurred between M2M devices, a collision resolution procedure is performed in order to resolve the collision situation. Accordingly, when an abnormal power outage event has occurred, there is a problem in that unnecessary power consumption of M2M devices increases and system resource efficiency may also be reduced.

SUMMARY OF THE INVENTION

Accordingly, the present invention is directed to a method for efficiently allocating resources in a broadband wireless access system that substantially obviates one or more problems due to limitations and disadvantages of the related art.

An object of the present invention is to provide a more efficient random access method and an apparatus for the same.

Another object of the present invention is to provide a method for efficiently determining the result of a random access attempt of a terminal.

Objects of the present invention are not limited to those described above and other objects will be clearly understood by those skilled in the art from the following description.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting an abnormal power down report from a Machine to Machine (M2M) device in a wireless communication system may include transmitting a Bandwidth Request (BR) preamble sequence and a first message to a base station, receiving an uplink resource allocation from the base station, transmitting the abnormal power down report using the uplink resource allocation, and starting a first timer for confirmation of the transmitted abnormal power down report, wherein the first message may include an identifier of the M2M device and a BR index for transmitting an abnormal power down report.

The method may further receiving a first confirmation signal from the base station in response to the transmitted abnormal power down report, and stopping the first timer in response to the received first confirmation signal.

The method may further include retransmitting the abnormal power down report to the base station when the M2M device has not received a first confirmation signal in response to the transmitted abnormal power down report from the base station before the first timer expires.

In another aspect of the present invention, a method for transmitting an abnormal power down report from a Machine to Machine (M2M) device in a wireless communication system may include transmitting a Bandwidth Request (BR) preamble sequence and a first message to a base station, and starting a first timer for confirmation of the transmitted first message, wherein the first message includes an identifier of the M2M device and a BR index indicating the abnormal power down report.

The method may further include receiving acknowledgement (ACK) information from the base station in response to the transmitted first message, and stopping the first timer in response to the received ACK information.

The method may further include retransmitting the BR preamble sequence and the first message to the base station when the M2M device has not received the ACK information from the base station before the first timer expires.

The method may further include receiving a first confirmation signal from the base station in response to the abnormal power down report included in the transmitted BR index, and stopping the first timer in response to the received first confirmation signal.

The method may further include retransmitting the BR preamble sequence and the first message to the base station when the M2M device has not received a first confirmation signal from the base station before the first timer expires.

In another aspect of the present invention, a Machine to Machine (M2M) device for transmitting an abnormal power down report in a wireless communication system may include a transmission module for transmitting a Bandwidth Request (BR) preamble sequence and a first message to a base station, a reception module for receiving an uplink resource allocation from the base station, and a processor for performing a control operation for transmitting the abnormal power down report using the uplink resource allocation and a control operation for starting a first timer for confirmation of the transmitted abnormal power down report, wherein the first message may include an identifier of the M2M device and a BR index for transmitting an abnormal power down report.

The reception module may receive a first confirmation signal from the base station in response to the transmitted abnormal power down report and the processor may perform a control operation for stopping the first timer in response to the received first confirmation signal.

In addition, the processor may perform a control operation for retransmitting the abnormal power down report to the base station when the M2M device has not received a first confirmation signal in response to the transmitted abnormal power down report from the base station before the first timer expires.

In another aspect of the present invention, a Machine to Machine (M2M) device for transmitting an abnormal power down report in a wireless communication system may include a transmission module for transmitting a Bandwidth Request (BR) preamble sequence and a first message to a base station, and a processor for performing a control operation for starting a first timer for confirmation of the transmitted first message, wherein the first message may include an identifier of the M2M device and a BR index indicating the abnormal power down report.

The M2M device may further include a reception module for receiving acknowledgement (ACK) information from the base station in response to the transmitted first message, wherein the processor may perform a control operation for stopping the first timer in response to the received ACK information.

The processor may perform a control operation for retransmitting the BR preamble sequence and the first message to the base station when the M2M device has not received the ACK information from the base station before the first timer expires.

The M2M device may further include a reception module for receiving a first confirmation signal from the base station in response to the abnormal power down report included in the transmitted BR index, wherein the processor may perform a control operation for stopping the first timer in response to the received first confirmation signal.

In addition, the processor may perform a control operation for retransmitting the BR preamble sequence and the first message to the base station when the M2M device has not received a first confirmation signal from the base station before the first timer expires.

Embodiments of the present invention have the following advantages.

According to the embodiments of the present invention, a terminal (M2M device) can efficiently transmit an abnormal power down report to a base station using uplink resources that have already been allocated to the terminal.

In addition, according to the embodiments of the present invention, the terminal can perform efficient communication using a timer for confirmation of the transmitted abnormal power down report.

Advantages of the present invention are not limited to those described above and other advantages will be clearly understood by those skilled in the art from the following description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
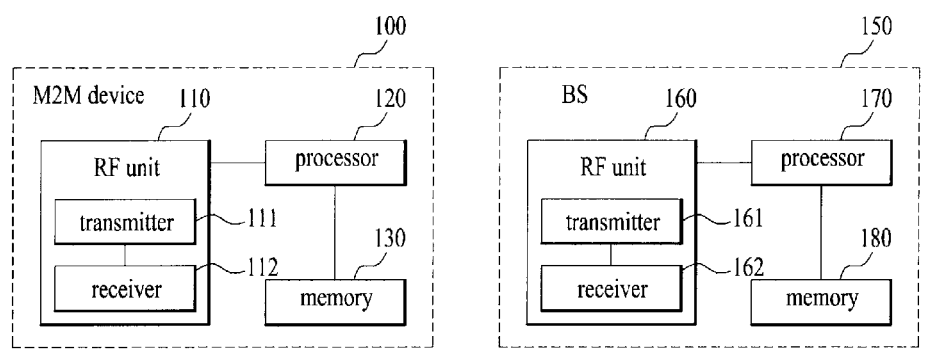
FIG. 1 schematically illustrates configurations of an M2M device and a base station according to an embodiment of the present invention.

The embodiments of the present invention provide a method and apparatus for broadcasting a Medium Access Control (MAC) control message in a wireless access system that supports M2M environments.

The embodiments described below are provided by combining components and features of the present invention in specific forms. The components or features of the present invention may be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described.

In this specification, the embodiments of the present invention have been described focusing mainly on the data communication relationship between a mobile station (MS) and a Base Station (BS). The BS is a terminal node in a network which performs communication directly with the MS. Specific operations which have been described as being performed by the BS may also be performed by an upper node of the BS as needed.

That is, the BS or any other network node may perform various operations for communication with MSs in a network including a number of network nodes including BSs. The term "Base Station (BS)" may be replaced with another term such as "fixed station", "Node B", "eNode B (eNB)", "Advanced Base Station (ABS)", or "Access Point (AP)".

The term "Mobile Station (MS)" may also be replaced with another term such as "User Equipment (UE)", "Subscriber Station (SS)", "Mobile Subscriber Station (MSS)", "mobile terminal", "Advanced Mobile Station (AMS)", or "terminal". Especially, in the present invention, the term "Mobile Station (MS)" may have the same meaning as "M2M device".

The term "transmitting end" refers to a stationary and/or mobile node that provides data or audio service and "receiving end" refers to a stationary and/or mobile node that receives data or audio service. Accordingly, in uplink, the MS may serve as a transmitting end and the BS may serve as a receiving end. Similarly, in downlink, the MS may serve as a receiving end and the BS may serve as a transmitting end.

The embodiments of the present invention can be supported by standard documents of at least one of the IEEE 802xx system, the 3GPP system, the 3GPP LTE system, and the 3GPP2 system which are wireless access systems. That is, obvious steps or portions that are not described in the embodiments of the present invention can be explained with reference to the standard documents.

For all terms used in this disclosure, reference can be made to the standard documents. Especially, the embodiments of the present invention can be supported by at least one of P802.16e-2004, P802.16e-2005, P802.16m, P802.16p, and P802.16.1b which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Embodiments of the present invention will now be described in detail with reference to the accompanying drawings so that those skilled in the art can easily practice the present invention. However, the present invention is not limited to the embodiments described below and can be implemented in various other forms. Portions which are not specifically related to the present invention will not be described in order to clearly explain the present invention and like reference numbers will be used throughout the drawings to refer to like parts.

The expression "a portion includes a specific component" used throughout this specification indicates that the portion may also include other components, rather than including the specific component alone, unless explicitly stated otherwise. The terms "unit", "er(or)" or "module" used in this specification refer to a unit performing at least one function or operation, which can be realized by hardware or software or by a combination of hardware and software.

Specific terms used in the embodiments of the present invention are provided for better understanding of the present invention and can be replaced with other terms without departing from the spirit of the present invention.

First, the M2M device is described before the present invention is described in detail.

The term "M2M communication" refers to a type of communication which is performed between terminals via a base station or between a base station and terminals without humans being involved or a type of communication which is performed between M2M devices. Thus, the term "M2M device" refers to a terminal that can support M2M device communication as described above.

An access service network for M2M services is referred to as an M2M Access Service Network (ASN) and a network entity that communicates with M2M devices is referred to as an M2M server. The M2M server executes an M2M application and provides M2M specific services for one or more M2M devices. The term "M2M feature" refers to a feature of the M2M application and one or more features may be required to provide the application. The term "M2M device group" refers to a group of M2M devices that share one or more features.

The number of devices that communicate in an M2M manner (which may be variously referred to as M2M devices, M2M communication devices, or Machine Type Communication (MTC) devices) will gradually increase as the number of machine application types increases.

Such machine application types include (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion. However, the machine application types do not need to be limited to these types and various other machine application types may be applied.

Another feature of the M2M device is low mobility such that the M2M device is subject to very little movement once installed. That is, the M2M device may remain stationary for a long time. The system can simplify or optimize mobility-related operations for specific M2M applications having fixed positions such as applications for secured access and surveillance, public safety, payment, remote maintenance and control, and metering.

As the number of device application types increases, the number of M2M communication devices may significantly increase compared to the number of general mobile communication devices. In the case in which all M2M communication devices individually perform communication with a base station, such communication may impose serious load on a wireless interface and/or a network.

Embodiments of the present invention are described below with reference to the case in which M2M communication is applied to a wireless communication system (for example, a P802.16e, P802.16m, P802.16.1b, or P802.16p system) as an example. However, the present invention is not limited to such systems and may also be applied to a different communication system such as a 3GPP LTE/LTE-A system.

FIG. 1 schematically illustrates configurations of an M2M device and a base station according to an embodiment of the present invention.

As shown in FIG. 1, the M2M device 100 and the base station 150 may include Radio Frequency (RF) units 110 and 160, and processors 120 and 170, respectively, and may optionally include memories 130 and 180, respectively. Although FIG. 1 shows the configurations of one M2M device and one base station, an M2M communication environment may be implemented between a plurality of M2M devices and a base station.

The RF units 110 and 160 may include transmitters 111 and 161 and receivers 112 and 162, respectively. The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices. The processor 120 may transmit a signal to the transmitter 111 after performing a variety of processes upon the signal and may process a signal received by the receiver 112.

When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the device application type of the M2M device. For example, when the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates, as an example, the case in which communication is performed between the M2M device 100 and the base station 150, M2M communication methods according to the present invention may be performed between M2M devices and each of the M2M devices may have the same configuration as shown in FIG. 1 and may perform methods according to various embodiments described below in the same manner as shown in FIG. 1.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices. The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described above.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data. The memories 130 and 180 are connected to the processors 120 and 170 and store operating systems, applications, and general files, respectively.

Each of the processors 120 and 170 of the present invention may also be referred to as a controller, a microcontroller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

The following is a description of a general random access uplink resource request procedure in a broadband wireless access system.

Figure 2:
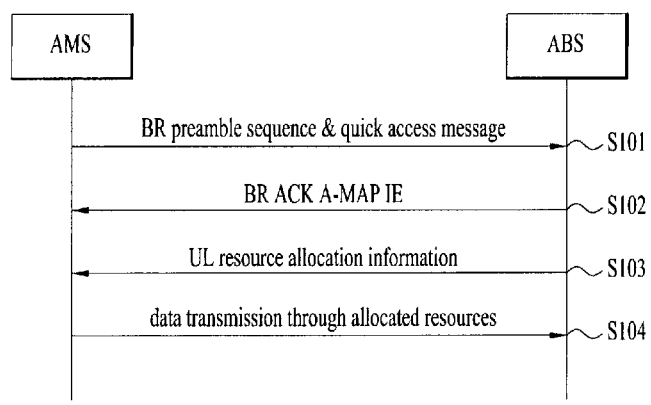
FIG. 2 illustrates a 3-step uplink resource request procedure that may be performed in a general IEEE 802.16 system.

FIG. 2 illustrates a 3-step uplink resource request procedure that may be performed in a general IEEE 802.16 system.

As shown in FIG. 2, a terminal (AMS) transmits a bandwidth request (BR) preamble sequence (i.e., a BR code) and a quick access message including uplink bandwidth request information (such as a station ID and a BR index indicating the size of a requested resource region) to a base station (ABS) (S101).

Here, the quick access message may have a format as shown in the following Table 1.

TABLE 1

| Syntax | Size (bits) | Notes |
|---|---|---|
| Quick Access Message( ) { | | |
| STID | 12 | Station ID |
| Predefined BR index | 4 | Range: 0-15. Definition is MS specific based on AAI-DSx negotiation. |
| } | | |

Then, the base station may transmit information regarding the state of reception of the BR preamble sequence and the quick access message transmitted by each terminal to the terminal through a bandwidth request acknowledgement A-MAP information element (BR ACK A-MAP IF) (S102).

Here, the bandwidth request acknowledgement A-MAP information element (BR ACK A-MAP IF) may have a format as shown in the following Table 2.

TABLE 2

| Syntax | Size (bits) | Notes |
|---|---|---|
| BR-ACK_A-MAP_IE( ) { | | |
|   A-MAP IE Type | 4 | BR-ACK A-MAP IE |
|   BR-ACK Bitmap | N_BR_Opportunities | Each bit indicates whether this BR-ACK A-Map IE includes the decoding status of the BR preamble in the corresponding BR opportunity or not. The bitmap size is the number of BR opportunities in a frame, and the bitmap is encoded in ascending order of the BR opportunity index.<br>0b0: No BR preamble sequence is detected,<br>0b0: At least one preamble sequence is detected<br>N_BR_opportunities ≤ 4 |
|   MSB of resource start offset | 2 | 0b00, 0b01, 0b10: 2-bit-MSB of the start offset of the resource allocation (LRU)<br>0b11: No grant exist in this BR-ACK A-MAP IE. |
|   if (MSB of resource start offset != 0b11) { | | |
|     LSB of resource start offset | 5 | This field is the LSB of the start offset of the Resource allocation (LRU) for BR Header |
|     HFA start offset | 6 | This field is start offset of HARQ Feedback Allocation. |
|     Allocation size | 1 | Resource size for each BR header<br>0b0: 1 LRU<br>0b1: 2 LRUs |
|     Long TTI Indicator | 1 | Indicates number of AAI subframes spanned by the allocated resource for BR header.<br>0b0: 1 AAI subframe (default)<br>0b1: 4 UL AAI subframes for FDD or all UL subframes for TDD<br>If number of DL AAI subframes, D, is less than number of UL AAI subframes, U, Long TTI Indicator = 0b1 |
|   } | | |
|   for ( i = 0; i < N_BR_Opportunities ; i++) | | |
|   { | | |
|     if (BR-ACK Bitmap[i] == 1) { | | |
|       Number of received preamble sequences (L) | 2 | The number of BR preamble sequence indices included in this ACK A-MAP IE.<br>0b00: 1<br>0b01: 2<br>0b10: 3<br>0b11: 4 |
|       for (j = 0; j < L; j++) { | | |
|         Preamble sequence index | 5 | Preamble sequence index received in the BR opportunity |
|         MSG decoding indicator | 1 | To indicate the decoding status of quick access message<br>0b0: MSG not decoded |

TABLE 2-continued

| Syntax | Size (bits) | Notes |
|---|---|---|
| | | 0b1: MSG decoded relevant to Preamble sequence index |
| If (MSB of resource start offset != 0b11) && (MSG decoding indicator == 0b0){ | | |
|     Grant indicator | 1 | To indicate whether gtant of BR Header for the BR preamble sequence index is included or not<br>0b0: No UL resource allocation<br>0b1: UL resource allocation for BR with STID header |
|     } | | |
|    } | | |
|   } | | |
| } | | |
| Reserved | variable | To reach 40-bit assignment A-MAP IE size. |
| } | | |

When the base station has properly received the BR preamble sequence and the quick access message transmitted by the terminal, the base station allocates uplink resources to the terminal through a UL basic assignment A-MAP IE (S103).

The terminal can transmit data to the base station through the allocated uplink resources (S104).

Figure 3:
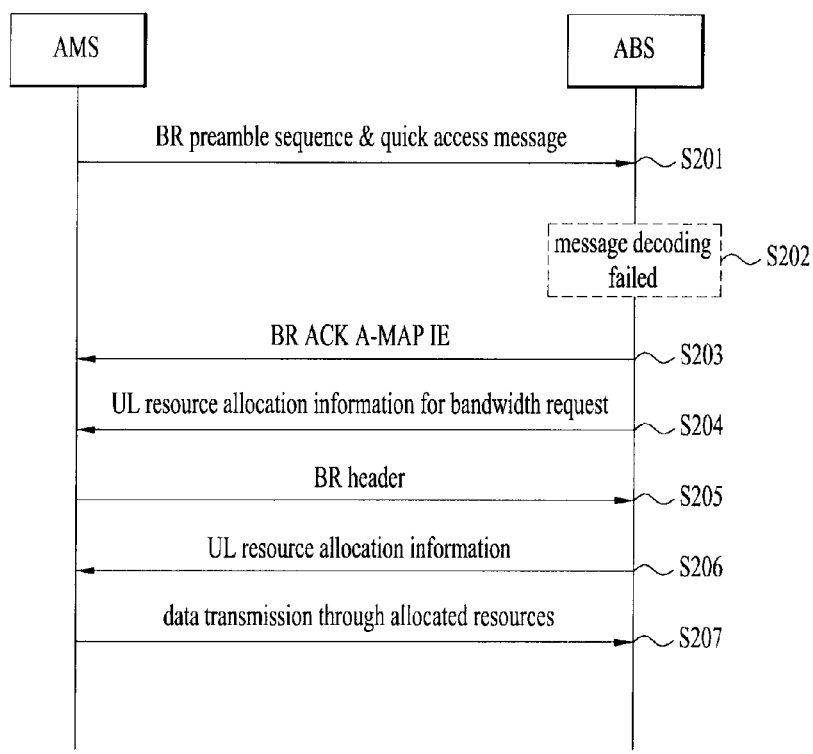
FIG. 3 illustrates a 5-step uplink resource request procedure that may be performed in a general IEEE 802.16 system.

FIG. 3 illustrates a 5-step uplink resource request procedure that may be performed in a general IEEE 802.16 system.

The example of FIG. 3 is described below on the assumption of a fallback mode in which a quick access message has been lost. As shown in FIG. 3, a terminal (AMS) transmits a bandwidth request (BR) preamble sequence (i.e., a BR code) and a quick access message including uplink bandwidth request information (such as a station ID and a BR index indicating the size of a requested resource region) to a base station (ABS) (S201).

Here, the base station fails to properly decode the quick access message due to a transmission error (S202).

The base station may transmit information regarding the state of reception of the BR preamble sequence and the quick access message transmitted by each terminal to the terminal through a bandwidth request acknowledgement A-MAP information element (BR ACK A-MAP IE) (S203).

When the base station has properly received only the BR preamble sequence transmitted by the terminal, the base station allocates uplink resources for bandwidth request (BW-REQ) message transmission to the terminal through a CDMA allocation A-MAP IE since the base station cannot determine the size of the resource region requested by the terminal (S204).

The terminal transmits a BW-REQ message (in the form of a header) including information regarding resources requested by the terminal to the base station through the allocated resources (S205).

When the base station has received the BW-REQ message transmitted by the terminal, the base station allocates uplink resources to the terminal through a UL basic assignment A-MAP IE (S206).

The terminal can transmit data to the base station through the allocated uplink resources (S207).

The procedure is performed in the same manner as a general 5-step bandwidth request procedure when the terminal has not transmitted the quick access message to the base station in the above step S201.

Figure 4:
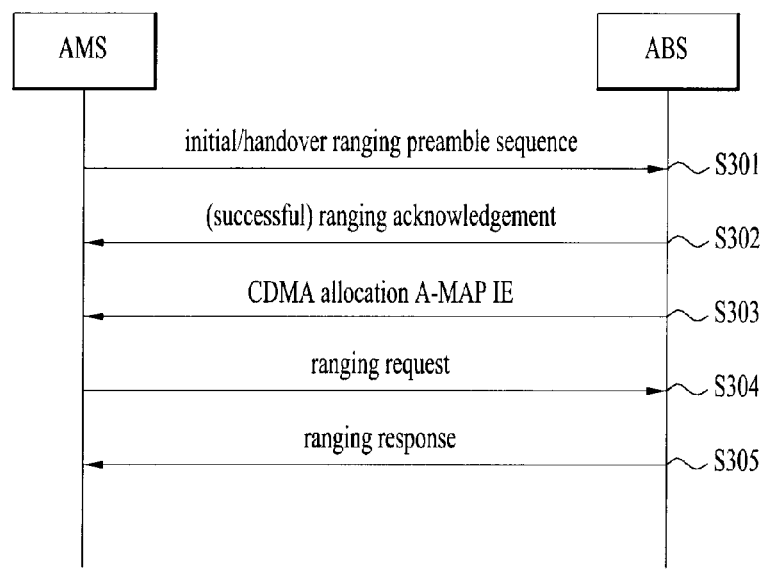
FIG. 4 illustrates an exemplary initial/handover ranging procedure that may be performed in a general IEEE 802.16 system.

FIG. 4 illustrates an exemplary initial/handover ranging procedure that may be performed in a general IEEE 802.16 system.

As shown in FIG. 4, first, a terminal (AMS) transmits a ranging preamble code for initial/handover ranging to a base station (ABS) (S301).

The base station may transmit a ranging acknowledgement (AAI_RNG-ACK) message including the reception state of a ranging preamble code transmitted by each terminal and a physical adjustment value (such as timing, power, or frequency) to the terminal (S302).

When the base station has properly received the ranging preamble code, the base station allocates, to each terminal, uplink resources required for the terminal to transmit a ranging request (AAI_RNG-REQ) message through a CDMA allocation A-MAP IE (S303).

The terminal transmits an AAI_RNG-REQ to the base station through the allocated uplink resources (S304).

The base station transmits a ranging response (AAI_RNG-RSP) message to the terminal as a response to the AAI_RNG-REQ message transmitted by the terminal (S305).

Figure 5:
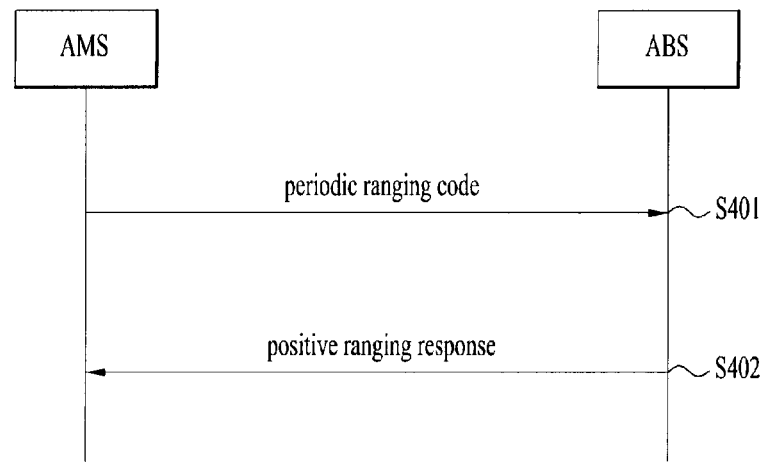
FIG. 5 illustrates an exemplary periodic ranging procedure that may be performed in a general IEEE 802.16 system.

FIG. 5 illustrates an exemplary periodic ranging procedure that may be performed in a general IEEE 802.16 system.

As shown in FIG. 5, a terminal (AMS) transmits a ranging preamble code for periodic ranging to a base station (ABS) (S401).

The base station may transmit a ranging response (AAI_RNG-ACK) message including the reception state of a ranging preamble code transmitted by each terminal and a physical adjustment value (such as timing, power, or frequency) to the terminal (S402).

To allow the terminal to transmit a preamble code to the base station in the random access procedures described above with reference to FIGS. 2 to 5, an RA region, through which the terminal can perform random access, should be present in a frame or in a subframe which is a unit smaller than the frame. Such an RA region may be divided into a BR region through which the terminal requests resource allocation and a ranging region through which the terminal attempts ranging. An exemplary arrangement of such a random access region is described below with reference to FIG. 6.

Figure 6:
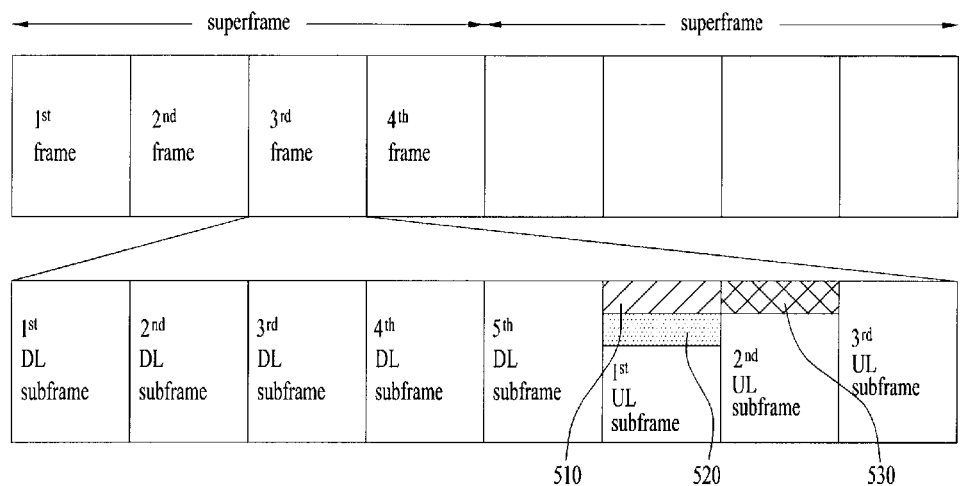
FIG. 6 illustrates an exemplary arrangement of a random access region when the downlink to uplink ratio is 5:3 in a general IEEE 802.16 system.

FIG. 6 illustrates an exemplary arrangement of a random access region when the downlink to uplink ratio is 5:3 in a general IEEE 802.16 system.

In the example of FIG. 6, a random access region is present in a third frame of a first superframe. More specifically, the random access region may include bandwidth request regions 510 and 530 and a ranging region 520.

The base station may transmit a list of BR preamble sequences or the like that have been successfully received through the BR region to the terminal through a BR ACK A-MAP and may transmit a list of ranging preamble codes or the like that have been successfully received through the BR region to the terminal through an AAI_RNG-ACK message.

Based on such ACK information, the terminal may determine whether or not the random access attempt of the terminal has succeeded. Accordingly, the terminal needs to check whether or not the ACK information has been transmitted every subframe. If the ACK information is transmitted in a broadcast manner, the terminal needs to also decode a broadcast type message or A-MAP in order to check even the broadcast type message or A-MAP.

Figure 7:
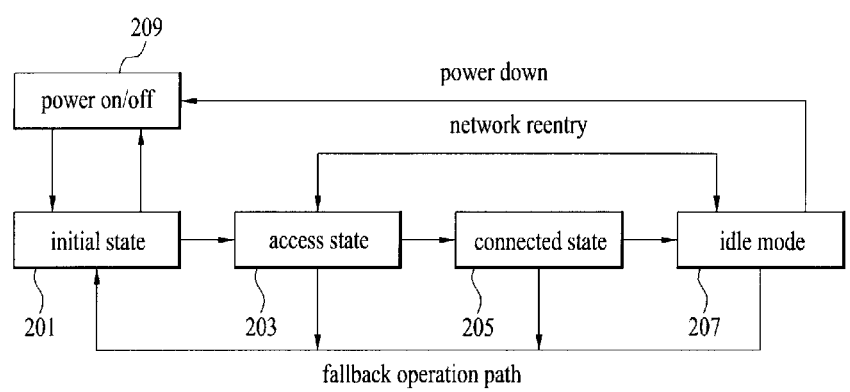
FIG. 7 illustrates an exemplary state transition procedure of an M2M device used in the present invention.

FIG. 7 illustrates an exemplary state transition procedure of an M2M device used in the present invention.

When the M2M device is powered on, the M2M device enters an initial state 201. Thereafter, in an access state 203, the M2M device performs an initial network entry procedure to enter a connected state 205. In the connected state, the M2M device transmits and receives data to and from a base station and enters an idle mode 207 when the M2M device has no data to be transmitted or received. In the idle mode, the M2M device enters a power off state 209 via a power down procedure. That is, when a power down has occurred in the M2M device in the idle mode, the M2M device performs a location update procedure for power down to enter a power off state.

Even when a power down event (for example, a power outage event) has occurred when the M2M device transmits or receives data in the connected state, the M2M device enters the idle mode and performs location update to enter a power off state.

Figure 8:
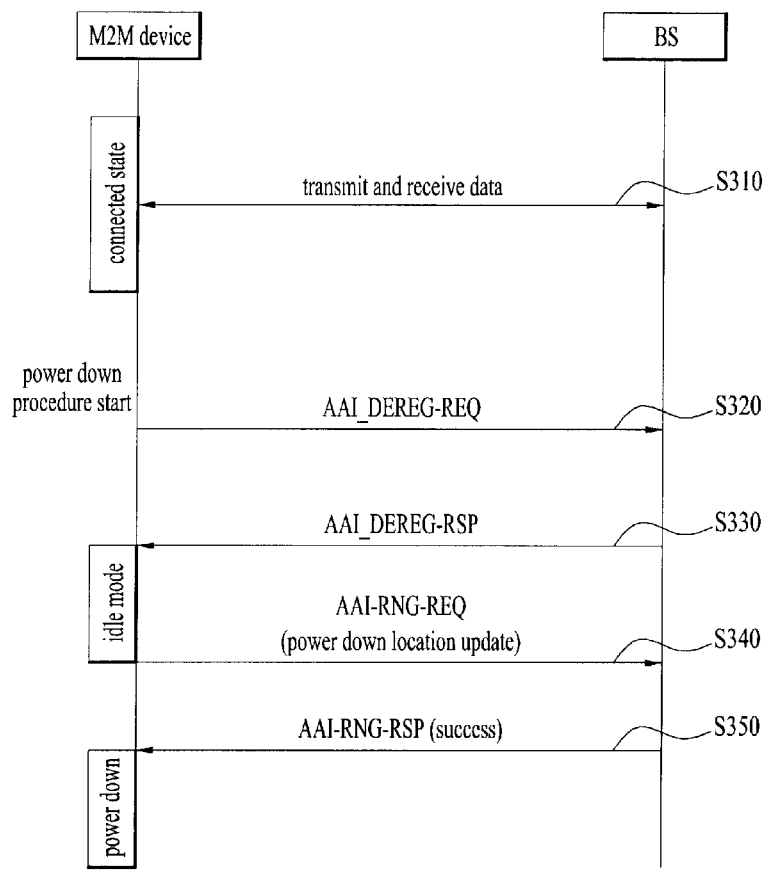
FIG. 8 illustrates one method in which an M2M device of the present invention performs power down.

FIG. 8 illustrates one method in which an M2M device of the present invention performs power down.

In a normal mode, i.e., in a connected state, the M2M device transmits or receives data to or from the base station (S310).

If a power down event has occurred in the M2M device, the M2M device transmits a deregistration request (AAI-DREG-REQ) message to the base station in order to enter a power off state (S320).

When the base station has received the deregistration request message, the base station transmits a deregistration response (AAI-DREG-RSP) message in response to the deregistration request message to permit the M2M device to enter the idle mode (S330).

When the M2M device has received the deregistration response message, the M2M device enters the idle mode and performs location update in order to enter a power off state. That is, the M2M device transmits a ranging request (AAI-RNG-REQ) message including a power down location update indicator to the base station (S340).

The base station transmits a ranging response message indicating ranging success to the M2M device in response to the ranging request message (S350).

When the M2M device has received the ranging response message, the M2M device enters a power down state.

As shown in FIG. 8, in the connected state, the M2M device performs a power down procedure through the deregistration procedure (S320 and S330), the power down location update procedure, and the like.

However, the operation method of FIG. 8 has a disadvantage in that the M2M device or the base station performs an unnecessary procedure. In addition, the M2M device may delay a power outage report procedure of the M2M device when an unintended power outage event has occurred.

The term "abnormal power down" refers to a phenomenon in which power is reduced abnormally or involuntarily. When such abnormal power down has occurred in an M2M device, the M2M device transmits an abnormal power down report to the base station.

When the M2M device has detected that abnormal power down has occurred, the M2M device may transmit an AAI-RNG-REQ message including a ranging purpose indication, which indicates that abnormal or involuntary power down has occurred, to the base station. Here, the terms "ranging purpose indication" and "AAI-RNG-REQ" may be used interchangeably with "M2M abnormal power down report header".

The following is a detailed description of methods for performing an abnormal power down report according to embodiments of the present invention.

Figure 9:
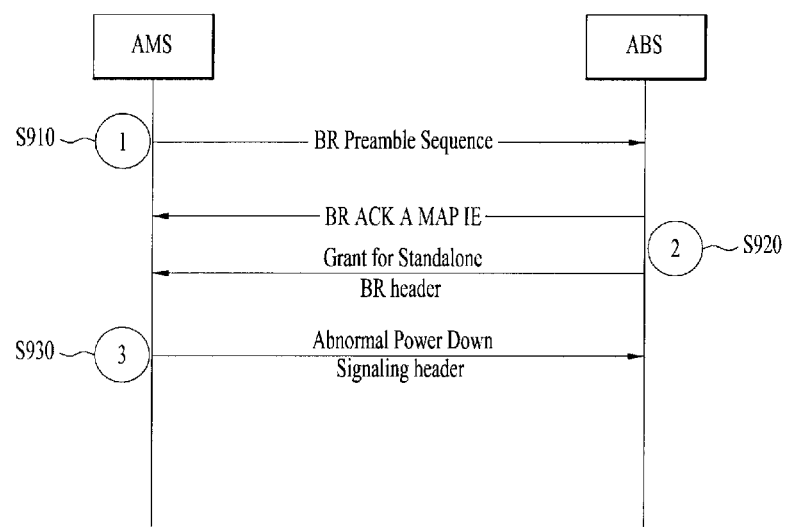
FIG. 9 illustrates an exemplary method for transmitting an abnormal power down report according to an embodiment of the present invention.

FIG. 9 illustrates an example in which an M2M device transmits an abnormal power down report according to an embodiment of the present invention.

In embodiments of the present invention, an M2M device may report an abnormal power down event to a base station by transmitting a signaling header in a connected state.

Although only one M2M device (denoted by "AMS" in FIG. 9) is illustrated in FIG. 9 for ease of explanation, two or more M2M devices may perform communication with the base station (denoted by "ABS" in FIG. 9).

Here, it is assumed that an abrupt power outage event has occurred in the M2M device. In this case, the M2M device transmits a Bandwidth Request (BR) preamble sequence to the base station in order to request a bandwidth for transmitting a signaling header (S910).

Upon receiving the BR preamble sequence, the base station allocates wireless resources to the M2M device. Thereafter, the base station may transmit an allocation information element (IE) including resource allocation information associated with the allocated wireless resources to the M2M device (S920).

When the M2M device has received the allocation IE including the resource allocation information, the M2M device may transmit a signaling header including a power outage indicator indicating that a power outage event has occurred to the base station (S930).

Figure 10:
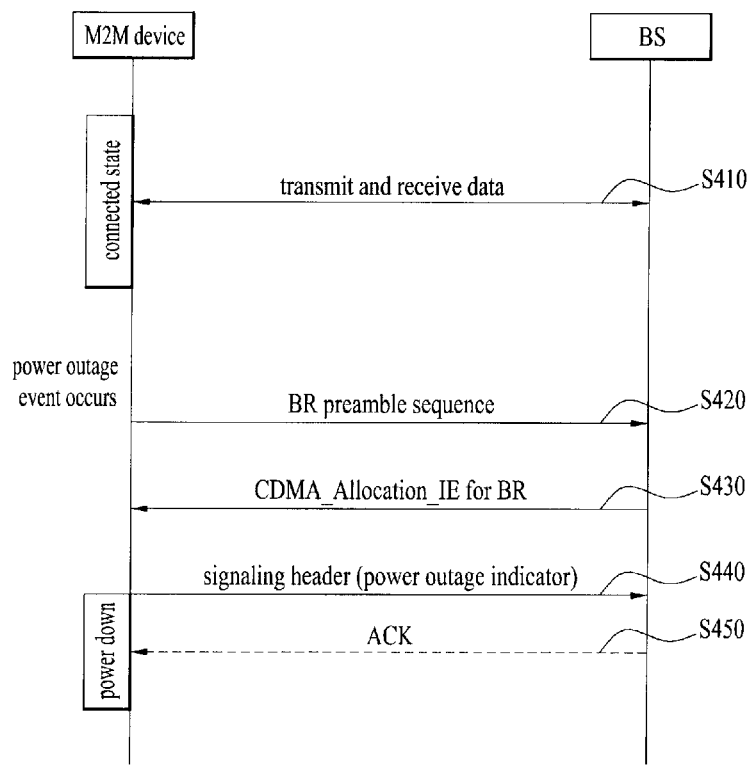
FIG. 10 illustrates an example in which a terminal transmits an abnormal power down report and receives a confirmation signal from a base station according to the embodiment of the present invention.

FIG. 10 illustrates another exemplary method for transmitting an abnormal power down report according to an embodiment of the present invention.

As shown in FIG. 10, the M2M device and the base station (BS) are transmitting and receiving data in a connected state (S410).

Here, it is assumed that an abrupt power outage has occurred in the M2M device. In this case, the M2M device transmits a Bandwidth Request (BR) preamble sequence to the base station in order to request a bandwidth for transmitting a signaling header (S420).

Upon receiving the BR preamble sequence, the base station allocates wireless resources to the M2M device. Thereafter, the base station may transmit a CDMA allocation information element (IE) including resource allocation information associated with the allocated wireless resources to the M2M device (S430).

When the M2M device has received the CDMA allocation IE, the M2M device may transmit a signaling header including a power outage indicator indicating that a power outage event has occurred to the base station (S440).

When the base station has received the signaling header including the power outage indication, the base station may transmit a corresponding response message to the M2M device. Here, an acknowledgement (ACK) message may be used as the response message. Alternatively, the base station may transmit an M2M abnormal power-off check header as a response message to the M2M device to instruct the M2M device to perform a power down operation (S450).

When the M2M device has transmitted the signaling header including the power outage indicator to the base station in step S440, the M2M device may immediately perform a power down operation or may perform a power down operation after receiving an ACK message in step S450.

The following Table 3 illustrates an exemplary signaling header that can be used in step S910 of FIG. 9 or step S440 of FIG. 10.

TABLE 3

| Syntax | Size (bits) | Notes |
|---|---|---|
| Emergency report ( ) { | | |
| FID | 4 | Flow Identifier. Set to 0b0010 |
| Type | 5 | MAC Signaling header type = 0b01000 |
| Length | 3 | Indicates the length of the signaling header in bytes |
| STID | 12 | STID of the M2M device that transmits power down report signaling header |
| STID_Valid_Offset | 3 | STID_Valid_Offset of the M2M device that sends power down report. If the assigned STID is not shared with other M2M devices, M2M device shall set this field to zero. |
| Emergency Type | 3 | 0b000: Power Outage 0b001~0b111: Reserved |
| Reserved | 18 | Reserved. This field shall be set to Zero. |
| } | | |

As shown in Table 3, the signaling header may include a Flow Identifier (FID) set to "0b0010", a type field indicating the type of an MAC signaling header, a length field indicating the length of the signaling header, an STID field indicating an STID of an M2M device that transmits an abnormal power down report, an STID valid offset field of the M2M device that transmits the abnormal power down report, an emergency type field indicating the type of the abnormal power down report, and the like.

If the STID is assigned such that it is not shared with other M2M devices, the STID valid offset field may be set to zero.

Since the purpose of transmitting an abnormal power down report using a quick access uplink allocation request procedure is not associated with uplink allocation, the base station does not allocate uplink resources according to a conventional uplink procedure.

Accordingly, since the terminal (M2M device) does not need to await uplink allocation, there is a need to perform a procedure suitable for the purpose of abnormal power down reporting.

The following is a detailed description of transmission of an abnormal power down report by a terminal using a quick access uplink allocation request procedure.

In step S910 of FIG. 9, the M2M device transmits, to the base station, a BR preamble sequence and a quick access message which includes a BR index and an STID for power down report purposes at an arbitrarily selected BR opportunity.

Here, operation of the M2M device and the base station may differ in each of the following 5 cases.

First Embodiment

First, a description is given of the case in which a base station transmits a UL grant within a BR_ACK_Offset when the base station has failed to decode a quick access message although it has properly received a BR preamble sequence.

Figure 11:
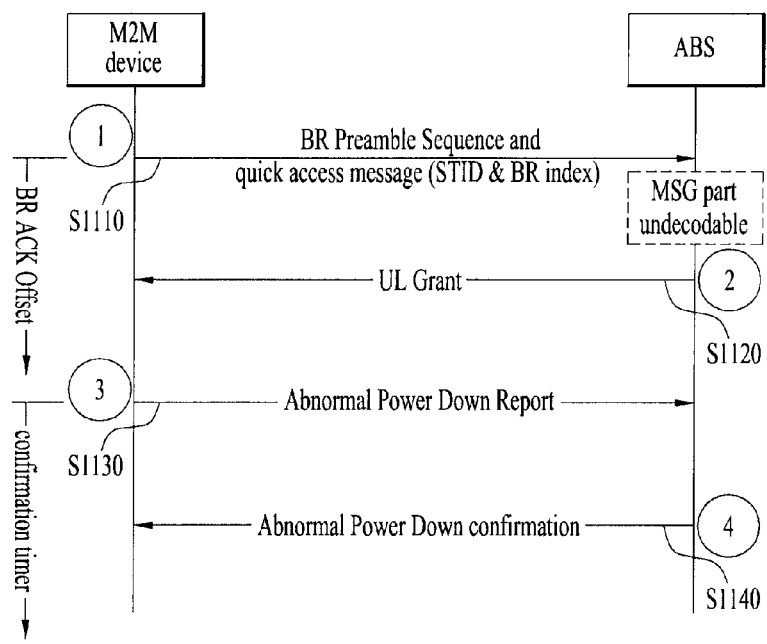
FIG. 11 illustrates one example of transmission of an abnormal power down report through a quick access uplink allocation request procedure in association with the embodiment of the present invention.

FIG. 11 illustrates operation of an M2M device and a base station according to the first embodiment.

As shown in FIG. 11, the base station transmits uplink allocation information (UL grant), which is generated according to reception of the BR preamble sequence (i.e., failure of the quick access message), to the M2M device within a BR_ACK_Offset (S1120).

When the M2M device has received uplink resource information allocated to the M2M device within the BR_ACK_Offset, the M2M device transmits a signaling header indicating abnormal power down to the base station through the allocated uplink resources (S1130). Here, an M2M device, to which a shared STID has been allocated, receives a UL grant only within a valid frame.

After an abnormal power down signaling header is transmitted, a timer for awaiting reception of a confirmation indicating whether or not a power down report has been received may start. Here, the timer may be newly defined or may be replaced with a default BR timer or a differentiated BR timer.

When the base station has received the signaling header, the base station determines that the M2M device has been subjected to abnormal power down. In response to this, the base station notifies the M2M device that the abnormal power down report has been properly received (S1140).

Here, the base station may use the following method in order to notify the M2M device that the abnormal power down report has been properly received from the M2M device.

First, when resource allocation information associated with confirmation is transmitted through a MAP masked with a RAID, the base station may transmit, to the M2M device, a MAC management message (for example, an abnormal power down report confirmation) or a confirmation header including an STID_Valid_Offset and an STID, which is an identifier of the M2M device, included in the received abnormal power down report.

When resource allocation information associated with confirmation is transmitted through a MAP masked with an STID, the base station may transmit, to the M2M device, a MAC management message (for example, an abnormal power down report confirmation) or a confirmation header indicating whether or not the abnormal power down report has been received.

If the M2M device receives the abnormal power down report confirmation before the timer for awaiting reception of the abnormal power down report confirmation has expired, the M2M device determines that the base station has properly received the abnormal power down report transmitted by the M2M device. In response to this, the M2M device stops the timer and terminates the abnormal power down report procedure.

On the other hand, when the timer for awaiting reception of the abnormal power down report confirmation has expired, the M2M device may again perform the abnormal power down report procedure.

Second Embodiment

It is possible to consider the case in which a base station has properly received a BR preamble sequence and a quick access message transmitted by an M2M device.

Figure 12:
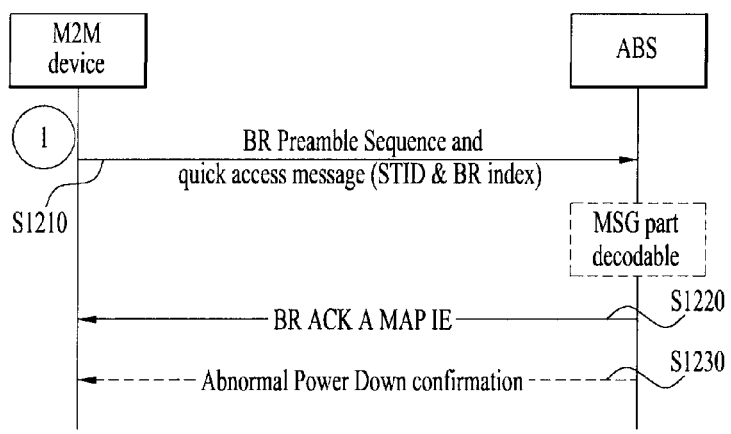
FIG. 12 illustrates another example of transmission of an abnormal power down report through a quick access uplink allocation request procedure in association with the embodiment of the present invention.

FIG. 12 illustrates operation of an M2M device and a base station according to the second embodiment.

As shown in FIG. 12, when the base station has received the BR preamble sequence and the quick access message (i.e., a BR index indicating power down), the base station determines that the M2M device has been subjected to abnormal power down.

In response to this, the base station needs to transmit a BR-ACK A-MAP IE to the terminal (M2M device) at a BR_ACK_Offset time (S1220).

The M2M device determines that the abnormal power down report transmitted by the M2M device has been properly received by the base station by receiving the BR-ACK A-MAP IE including an MSG decoding indicator value of 0b1, the BR preamble sequence and the opportunity transmitted by the M2M device.

In addition, the base station may use the following methods in order to additionally notify the M2M device that the abnormal power down report has been properly received from the M2M device (S1230).

First, when resource allocation information associated with confirmation is transmitted through a MAP masked with a RAID, the base station may transmit, to the M2M device, a MAC management message (for example, an abnormal power down report confirmation) or a confirmation header including an STID_Valid_Offset and an STID, which is an identifier of the M2M device, included in the received power down report.

In another method, when resource allocation information associated with confirmation is transmitted through a MAP masked with an STID, the base station may transmit, to the M2M device, a MAC management message (for example, an abnormal power down report confirmation) or a confirmation header indicating whether or not the abnormal power down report has been received.

Here, when the base station has received the BR preamble sequence and the quick access message (i.e., a BR index indicating power down), the base station determines that the M2M device has been subjected to abnormal power down.

Figure 13:
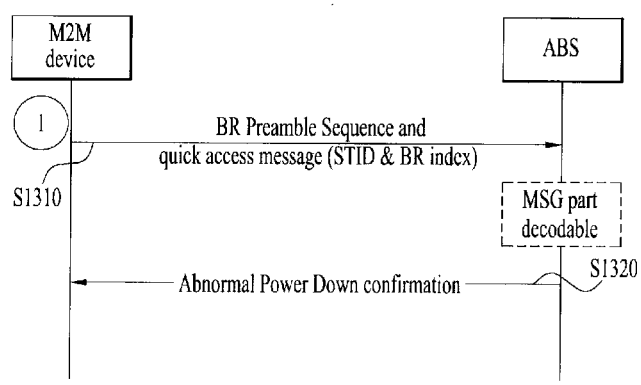
FIG. 13 illustrates another example of transmission of an abnormal power down report through a quick access uplink allocation request procedure in association with the embodiment of the present invention.

As shown in FIG. 13, the base station may transmit a confirmation header or a MAC management message (for example, an abnormal power down report confirmation) to the M2M device at the BR_ACK_Offset time or before the BR_ACK_Offset time (S1320).

Third Embodiment

It is also possible to consider the case, in which a base station transmits a BR ACK A-MAP IE at a BR_ACK_Offset time when the base station has failed to decode a quick access message although it has properly received a BR preamble sequence, as an example which does not fall within the first embodiment.

Figure 14:
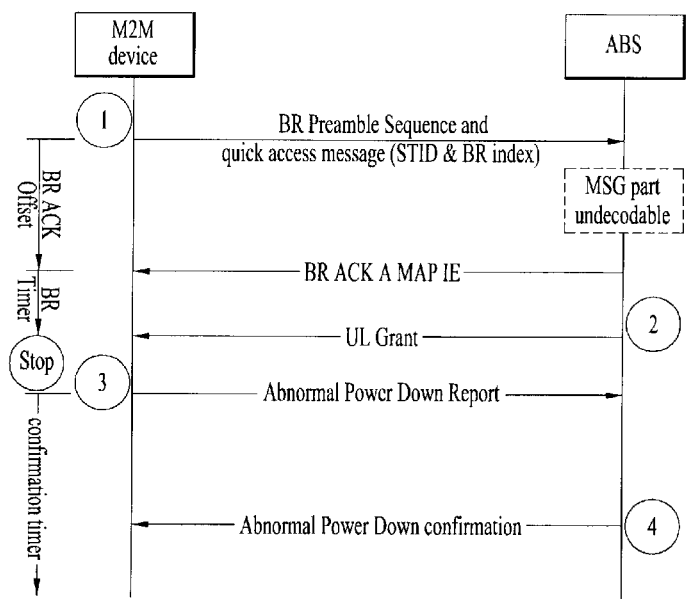
FIG. 14 illustrates another example of transmission of an abnormal power down report through a quick access uplink allocation request procedure in association with the embodiment of the present invention.

FIG. 14 illustrates operation of an M2M device and a base station according to the third embodiment.

As shown in FIG. 14, the base station transmits a BR-ACK A-MAP IE at the BR_ACK_Offset time.

Thereafter, the M2M device receives the BR-ACK A-MAP IE including an MSG decoding indicator value of 0b1, the BR preamble sequence and the opportunity transmitted by the M2M device. At this time, a default BR timer may be started.

When the M2M device has received uplink resource information allocated to the M2M device before the default BR timer expires, the M2M device transmits a signaling header indicating abnormal power down through the allocated uplink resources. Here, an M2M device, to which a shared STID has been allocated, receives a UL grant only within a valid frame.

After an abnormal power down signaling header is transmitted, a timer for awaiting reception of an abnormal power down report confirmation report may start. Here, the timer may be newly defined or may be replaced with a default BR timer or a differentiated BR timer as described above.

When the base station has received the signaling header, the base station may determine that the M2M device has been subjected to abnormal power down and then may notify the M2M device that the abnormal power down report has been properly received.

Here, the base station may use the following methods in order to notify the M2M device that the abnormal power down report has been properly received from the M2M device.

First, when resource allocation information associated with confirmation is transmitted through a MAP masked with a RAID, the base station may transmit, to the M2M device, a MAC management message (for example, an abnormal power down report confirmation) or a confirmation header including an STID_Valid_Offset and an STID, which is an identifier of the M2M device, included in the received abnormal power down report.

When resource allocation information associated with confirmation is transmitted through a MAP masked with an STID, the base station may transmit, to the M2M device, a MAC management message (for example, an abnormal power down report confirmation) or a confirmation header indicating whether or not the abnormal power down report has been received.

If the M2M device receives the abnormal power down report confirmation before the timer for awaiting reception of the abnormal power down report confirmation has expired, the M2M device determines that the base station has properly received the abnormal power down report transmitted by the M2M device. The M2M device stops the timer. Then, the abnormal power down report procedure is terminated.

On the other hand, when the timer for awaiting reception of the abnormal power down report confirmation has expired, the M2M device may again perform the abnormal power down report procedure.

Fourth Embodiment

It is also possible to consider the case, in which a base station transmits a BR ACK A-MAP IE at a BR_ACK_Offset time when the base station has failed to decode both a BR preamble sequence and a quick access message, as an example which does not fall within the first embodiment.

That is, when the M2M device has received a BR ACK A-MAP IE (Negative-ACK) indicating that the base station has not properly received the BR preamble sequence and the quick access message transmitted by the M2M device, the M2M device may again perform the abnormal power down report procedure.

Fifth Embodiment

It is also possible to consider the case, in which a base station does not transmit a BR ACK A-MAP IE at a BR_ACK_Offset time when the base station has failed to decode both a BR preamble sequence and a quick access message, as an example which does not fall within the first embodiment.

Figure 15:
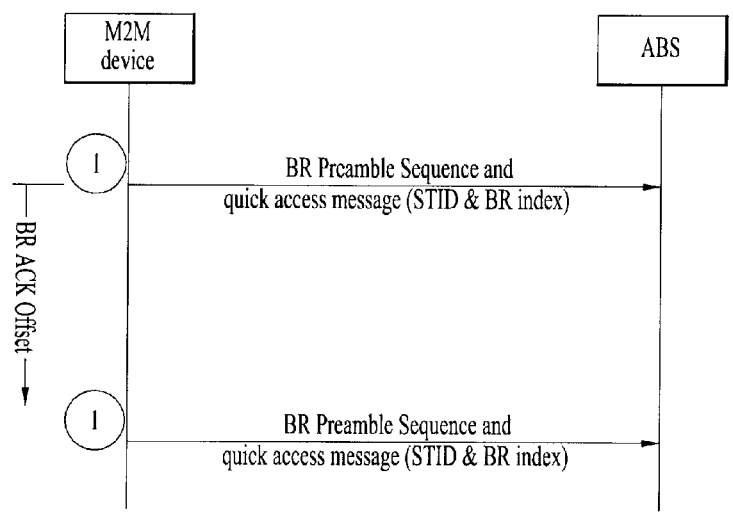
FIG. 15 illustrates another example of transmission of an abnormal power down report through a quick access uplink allocation request procedure in association with the embodiment of the present invention.

FIG. 15 illustrates operation of an M2M device and a base station according to the fifth embodiment.

As shown in FIG. 15, the M2M device may again perform the abnormal power down report procedure by receiving an implicit Negative-ACK that indicates that the BR ACK A-MAP IE has not been received.

As described above, in each case, the base station may use two methods in order to notify the M2M device that the abnormal power down report has been properly received from the M2M device.

In the first method, when resource allocation information associated with confirmation is transmitted through a MAP masked with a RAID, the base station may transmit, to the M2M device, a MAC management message (for example, an abnormal power down report confirmation) or a confirmation header including an STID_Valid_Offset and an STID, which is an identifier of the M2M device, included in the received abnormal power down report.

The following Table 4 illustrates an exemplary signaling header format that may be applied in this method.

TABLE 4

| Syntax | Size (bits) | Notes |
|---|---|---|
| Abnormal Power Down Confirmation ( ){ | | |
| FID | 4 | Flow Identifier. Set to 0b0010 |
| Type | 5 | MAC Signaling header type = 0b01001 (power down report confirmation) |
| Length | 3 | Indicates the length of the signaling header in bytes 0b000 and 0b001: Reserved 0b010: 2 bytes 0b011: 3 bytes 0b100: 4 bytes 0b101: 5 bytes 0b110: 6 bytes 0b111: Reserved |
| STID | 12 | STID of the M2M device in the received power down report signaling header |
| STID_Valid_Offset | 3 | STID_Valid_Offset of the M2M device in the received power down report signaling header |
| Reserved | variable | Reserved. This field shall be set to Zero. |
| } | | |

The A-MAP IE that may be applied to this method may have a format as shown in the following Table 5.

TABLE 5

| Syntax | Size (bits) | Notes |
|---|---|---|
| CDMA_Allocation_A-MAP_IE( ) { | — | — |
| A-MAP IE Type | 4 | CDMA Allocation A-MAP IE |
| CDMA allocation indication | 1 | 0b0: Bandwidth allocation in response to a received contention-based bandwidth request. 0b1: Bandwidth allocation in response to a received contention-based ranging request. |
| If (CDMA allocation indication = = 0b0){ | | |
| Resource Index | 11 | 512 FFT size: 0 in first 2 MSB bits + 9 bits for resource Index 1024 FFT size: 11 bits for resource Index 2048 FFT size: 11 bits for resource Index Resource Index includes location and allocation size. |
| Long TTI Indicator | 1 | Indicates number of AAI subframes spanned by the allocated resource. 0b0: 1 AAI subframe (default) 0b1: 4 UL AAI subframes for FDD or all UL AAI subframes for TDD If number of DL AAI subframes, D, is less than number of UL AAI subframes, U, Long TTI Indicator = 0b1 |
| HFA | 3 | HARQ Feedback Allocation |
| Reserved | 20 | Reserved bits |
| } | | |

Here, it is possible to add an uplink/downlink indicator. The uplink/downlink indicator may indicate a field for resource allocation in uplink or downlink.

In the case of downlink, it is also possible to add a HARQ channel identifier for HARQ operation, a HARQ identifier sequence number, and a HARQ subpacket identifier for HARQ IR.

In another method for allowing the base station to notify the M2M device that the abnormal power down report has been properly received from the M2M device, when resource allocation information associated with confirmation is transmitted through a MAP masked with an STID, the base station may transmit, to the M2M device, a MAC management message (for example, an abnormal power down report confirmation) or a confirmation header indicating whether or not the abnormal power down report has been received.

The signaling header that may be applied to this method may have a format as shown in the following Table 6. Contents of the following Table 6 are merely an example of the present invention and the present invention is not limited to the example.

TABLE 6

| Syntax | Size (bits) | Notes |
|---|---|---|
| Abnormal Power Down Confirmation ( ){ | | |
| FID | 4 | Flow Identifier. Set to 0b0010 |
| Type | 5 | MAC Signaling header type = 0b01001 (power down report confirmation) |
| Length | 3 | Indicates the length of the signaling header in bytes 0b000 and 0b001: Reserved 0b010: 2 bytes 0b011: 3 bytes 0b100: 4 bytes 0b101: 5 bytes 0b110: 6 bytes 0b111: Reserved |
| Reserved | variable | Reserved. This field shall be set to Zero. |
| } | | |

In a general uplink allocation request procedure, only a BR preamble sequence is transmitted. Such a general uplink allocation request procedure is similar to the quick access uplink allocation request procedures of the above embodiments other than the second embodiment.

In addition, a procedure for reporting abnormal power down using a ranging procedure is similar to a conventional ranging procedure. However, after the base station receives an RNG-REQ message for abnormal power down, the base station transmits an RNG-RSP message in order to indicate whether or not the RNG-REQ message has been received.

Here, the RNG-RSP message may additionally include parameters included in the confirmation signal.

An AAI-DSA-REQ message may be transmitted from the M2M device or the base station. The AAI-DSA-REQ message may include parameters for one or more service flows.

The M2M device or the base station may generate an AAI-DSA-REQ message including a control message type parameter indicating the type of the AAI-DSA-REQ message, a service flow parameter indicating track features and scheduling of the service flow, and a convergence sublayer parameter encodings parameter indicating features of CS-specific parameters of the service flow.

The AAI-DSA-REQ may further include a predefined BR index parameter.

The predefined BR index parameter is used for a BR index that is applied to a BR size and a BR action used in a 3-step bandwidth request.

The AAI-DSA-REQ message described above may have a format as shown in the following Table 7.

The STID allocated to the M2M device may be valid only within a frame (for example, Framenum) that satisfies Expression 1.

$$\text{Framenum mod STID\_Valid\_Periodicity} = \text{STID\_Valid\_Offset} \qquad \text{[Expression 1]}$$

Here, Framenum indicates a frame sequence number. An STID_Valid_Periodicity and an STID_Valid_Offset are transmitted within an AAI-regRSP message by the base station.

For M2M devices that share the same STID, respective STID_Valid_Periodicity values need to be identifiable and STID_Valid_Offset values need to be unique.

Here, the STID-sharing scheme does not prohibit the M2M device from performing bandwidth request in a frame.

Accordingly, a quick access message including different predefined BR indices may be used to identify the M2M devices that share the STID.

The following is a detailed description of a method for transmitting an abnormal power down report from a terminal that has a shared STID.

First, the base station receives a BR code and a quick access message.

Here, the quick access message may include only an STID and a BR index.

In a DSx procedure, a specific BR index may also be defined to be used to indicate "abnormal power down indication".

However, in the case in which a specific BR index is defined and used in a DSx procedure, there is a problem in that

TABLE 7

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: Abnormal Power Down Indication | Present if N-Predefined-BR-indices is not zero |
| . . . | | | |

As shown in Table 7, when the BR action is 0b11, the purpose indication bit may be used to indicate activity of the M2M device. That is, the purpose indication bit may indicate abnormal power down.

In addition, when the BR action is 0b00 or 0b01, the same BR index is not allocated to different service flows.

When the BR action is 0b10, the base station needs to allocate different BR indices to service flows having different UL grant scheduling types and to allocate different BR indices to service flows which have different BR sizes although they have the same UL grant scheduling type.

The base station may use an STID in order to identify M2M devices. The base station may allocate the same STID to a plurality of M2M devices.

In the case in which an STID allocated to an M2M device is shared with other M2M devices, the base station needs to allocate a frame in which the STID for the M2M device is valid.

a device that has a shared STID can transmit a BR code and a quick access message including a BR index that indicates "abnormal power down indication" only at a specific location (for example, a specific frame) where the STID of the device is valid.

That is, since an abnormal power down event may occur at any time and corresponding data is not time-tolerant enough to wait until a valid specific location is reached, the device in which such an abnormal power down event has occurred needs to be designed so as to be able to transmit the abnormal power down report at any time.

Accordingly, the present invention suggests a method in which another parameter which enables identification of a device having a shared STID is included in the message.

The following is a description of a detailed format of an AAI-DSA-REQ to which the suggested method of the present invention is applied.

First, the AAI-DSA-REQ message may have a format as shown in the following Table 8.

TABLE 8

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: Abnormal Power Down Indication | Present if N-Predefined-BR-indices is not zero |
| If(BR action==0b11) {<br>Indicator that represents whether the terminal acquires shared STID<br>If(Indicator that represents whether the terminal acquires shared STID==0b1) { | 1 | 0b0: the terminal acquires shared STID<br>0b1: the terminal does not acquire shared STID | |
| STID Valid Offset }} | 3 | STID Valid Offset of the M2M device | |

The AAI-DSA-REQ message may also have a format as shown in the following Table 9.

TABLE 9

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: Abnormal Power Down Indication | Present if N-Predefined-BR-indices is not zero |
| . . .<br>If(BR action==0b11) {<br>STID Valid Offset }} | 3 | STID Valid Offset of the M2M device | Present if the assigned STID is shared with other M2M devices. |

The AAI-DSA-REQ message may also have a format as shown in the following Table 10.

TABLE 10

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: Abnormal Power Down Indication | Present if N-Predefined-BR-indices is not zero |
| . . .<br>If(BR action==0b11) {<br>STID Valid Offset }} | 3 | STID Valid Offset of the M2M device If the assigned STID is not shared with other M2M devices, M2M device shall set this field to zero. | |

The AAI-DSA-REQ message may also have a format as shown in the following Table 11.

TABLE 11

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: Abnormal Power Down Indication | Present if N-Predefined-BR-indices is not zero |
| . . .<br>If(BR action==0b11) {<br>    STID Valid Offset }} | 3 | STID Valid Offset of the M2M device If the assigned STID is not shared with other M2M devices, M2M device shall set this field to zero. | |

The AAI-DSA-REQ message may also have a format as shown in the following Table 12.

TABLE 12

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP sendee flow requests to switch to Primary QoS parameters<br>0b10: BR<br>0b11: M2M Extensions | Present if N-Predefined-BR-indices is not zero |
| . . .<br>If(BR action==0b11) {<br>    Purpose Indication | 2 | 0b01: Abnormal Power Down Indication<br>0b10-0b11: reserved | |
|     If(Purpose Indication==0b1) {<br>        STID Valid Offset }} | 3 | STID Valid Offset of the M2M device | Present if the assigned STID is shared with other M2M devices. |

The AAI-DSA-REQ message may also have a format as shown in the following Table 13.

TABLE 13

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 . . . 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: M2M Extensions | Present if N-Predefined-BR-indices is not zero |
| . . . | | | |

TABLE 13-continued

| Field | Size (bits) | Value/Description | Conditions |
|---|---|---|---|
| If(BR action==0b11) { | | | |
| Purpose Indication | 2 | 0b01: Abnormal Power Down Indication<br>0b10-0b11: reserved | |
| If(Purpose Indication==0b1) { | | | |
| STID Valid Offset }} | 3 | STID Valid Offset of the M2M device<br>If the assigned STID is not shared with other M2M devices, M2M device shall set this field to zero. | |

The AAI-DSA-REQ message may also have a format as shown in the following Table 14.

TABLE 14

| Field | Size (bits) | Value/Description | Conditions |
|---|---|---|---|
| For( i = 1; i ≤ N-Predefined-BR-indices; i++) { | | The mapping of predefined BR index used in quick access message to BR size and BR actions N-Predefined-BR-indices is the number of predefined BR indices [1 ... 15] | |
| Predefined BR index | 4 | Predefined BR index | Present if N-Predefined-BR-indices is not zero |
| BR action | 2 | 0b00: ertPS service flow requests to resume to maximum sustained rate<br>0b01: aGP service flow requests to switch to Primary QoS parameters<br>0b10: BR<br>0b11: M2M Extensions | Present if N-Predefined-BR-indices is not zero |
| ... | | | |
| If(BR action==0b11) { | | | |
| Purpose Indication | 2 | 0b01: Abnormal Power Down Indication for M2M device which does not share the same STID<br>0b01: Abnormal Power Down Indication for M2M device which shares the same STID<br>0b10-0b11: reserved | |
| If(Purpose Indication==0b1) { | | | |
| STID Valid Offset }} | 3 | STID Valid Offset of the M2M device | |

In the abnormal power down reporting procedure, the terminal (M2M device) may not have power enough to receive a response message from the base station which indicates reception of the report. That is, a situation in which power of the M2M device is insufficient may occur.

Thus, according to another embodiment of the present invention, the terminal may not start the timer according to transmission of the abnormal power down report. Here, the abnormal power down report may be transmitted in a signaling header format or a conventional MAC management message format.

For example, in the case in which an abnormal power down report is transmitted through an RNG-REQ message, conventionally, the T3 timer is always started when the RNG-REQ message is transmitted. However, the terminal may not start the T3 timer since a power shortage situation may occur as described above.

On the other hand, states of the M2M device may be broadly divided into a connected state and an unconnected state. The connected state may further be divided into a normal mode and a sleep mode. The unconnected state may further be divided into an idle mode and a Deregistration with Context Retention (DCR) mode. The sleep mode and the idle mode are defined to efficiently use power of the M2M device.

First, in the sleep mode, the M2M device operates using a sleep mode pattern including a listening window and a sleep window approved by a base station through transmission and reception of AAI-SLP-REQ/AAI-SLP-REQ messages between the M2M device and the base station for power saving of the M2M device. In the idle mode, the M2M device operates using a paging group, a paging cycle, and a paging offset approved by the base station through transmission and reception of AAI-DREG-REQ/AAI-DREG-CMD messages between the M2M device and the base station for wireless resource saving and power saving of the M2M device.

In the normal mode, the M2M device performs an operation for providing a service provided by a corresponding system using wireless resources. In the DCR mode, context of the M2M device is stored in the network during a predetermined time although the M2M device has been deregistered from the network.

Basic operations of the sleep mode are described as follows. In the case in which uplink or downlink traffic is not generated for a predetermined time in the normal mode, the M2M device transmits an AAI-SLP-REQ message to the base station in order to request switching to the sleep mode. Upon receiving the request for switching to the sleep mode through the AAI-SLP-REQ message, the base station finally approves the request through an AAI-SLP-REQ message. Through the AAI-SLP-REQ message, the M2M device receives an ID (SLPID) allocated to the M2M device, the ID being used to identify an M2M device operating in the sleep mode, and then operates in the sleep mode.

Here, primary parameters acquired through message transmission and reception between the M2M device and the base station include an initial sleep window for specifying the size of an initial sleep window interval, a final sleep window base and a final sleep window exponent for specifying the size of a final sleep window interval, and a listening window for setting the size of a listening window interval. All the parameters are in units of a frame. The sleep window is an interval during which the M2M device, which operates in the sleep mode, minimizes power consumption. During the sleep window interval, the M2M device does not receive downlink control information and downlink traffic. The listening window is an interval during which the M2M device, which operates in the sleep mode, exits the sleep window to receive an AAI-TRF-IND message transmitted by the base station and determines presence or absence of downlink traffic destined for the M2M device. Thus, the M2M device can receive downlink control information and downlink traffic during the listening window interval.

The following is a description of basic operations of the idle mode. In the case in which downlink or uplink traffic is not generated for a predetermined time in the normal mode, the M2M device transmits an AAI-DREG-REQ message to the base station in order to request switching to the idle mode and then operates in the idle mode upon receiving an AAI-DREG-CMD from the base station. A paging cycle requested by the M2M device is defined in the AAI-DREG-REQ message, and a paging group ID, a paging offset, and a paging cycle are defined in the AAI-SLP-REQ message that the base station transmits to the M2M device upon receiving the AAI-DREG-REQ message. The M2M device sets a paging unavailable interval and a paging listening interval using corresponding parameters.

The term "idle mode" refers to a mode in which a paging group, a paging cycle, and a paging offset approved by the base station are used through signaling between the M2M device and the base station for power saving of the M2M device. That is, according to this mechanism, the M2M device can receive a downlink broadcast message at regular intervals without being registered with a specific base station even when the M2M device moves in a radio link environment in which a plurality of base stations is present over a broad area.

In the idle mode, not only a handover (HO) operation but also all normal operations are deactivated while only downlink synchronization is achieved to enable reception of a paging message, which is a broadcast message, only within a specific interval. The paging message instructs the M2M device to perform a paging action. For example, the paging action includes ranging and network reentry.

The idle mode may be initiated by the M2M device or the base station. That is, the M2M device may enter the idle mode by transmitting a deregistration request (DREG-REQ) message to the base station and receiving a deregistration response (DREG-RSP) message from the base station in response to the DREG-REQ message. The base station may also enter the idle mode by transmitting an unrequested deregistration response (DREG-RSP) message or a deregistration command (DREG-CMD) to the M2M device in response to the DREG-REQ message.

When the M2M device has received a paging message corresponding to the M2M device during an Available Interval (AI) in the idle mode, the M2M device switches to a connected mode through a network entry procedure with the base station to transmit and receive data to and from the base station.

The idle state or idle mode generally allows the M2M device to transmit downlink broadcast traffic at regular intervals without being registered with a specific base station when the M2M device moves in a radio link environment in which multiple base stations are present. The M2M device may switch to the idle mode in order to achieve power saving when the M2M device has not received traffic from a base station for a predetermined time. The M2M device, which has switched to the idle mode, may receive a broadcast message (for example, a paging message) broadcast by the base station during an Available Interval (AI) and determine whether the M2M device will switch to the normal mode or remains in the idle state.

In the idle state, it is possible to give a benefit to the M2M device by removing handover-related activation requirements and general operation requirements. In the idle state, it is possible to give a benefit to the network or the base station by providing a simple and appropriate method enabling the network or the base station to notify the M2M device of pending downlink traffic and removing a radio interface and network handover (HO) traffic from the M2M device.

The term "paging" refers to a function to determine the location of an M2M device (for example, a base station or a switching center) when a terminated call for the M2M device is generated during mobile communication. A number of base stations that support the idle state or the idle mode may belong to a specific paging group and constitute a paging area. Here, the paging group is a logical group. The purpose of the paging group is to provide an adjacent region that enables paging in downlink when traffic destined for the M2M device is present. It is preferable that the paging group be configured so as to satisfy a condition that the paging group is large enough that the M2M device is mostly present within the same paging group and a condition that the paging group is small enough to keep paging load at an appropriate level.

The paging group may include one or more base stations and one base station may be included in one or more paging groups. The paging group is defined in a management system. A paging group-action backbone network message may be used in the paging group. The paging controller may manage initial paging of all base stations belonging to the paging group and manage a list of M2M devices, which are in an idle state, using a paging-announce message which is a backbone message.

Paging in the idle mode is described below with reference to an IEEE 802.16 system for ease of explanation. However, the spirit of the present invention is not limited to the IEEE 802.16 system. An M2M device transmits a deregistration request (DREG-REQ) message to a base station to request deregistration from the base station in order to enter an idle mode. Thereafter, the base station transmits a deregistration response (DREG-RSP) message to the M2M device as a response to the DREG-REQ message. Here, the DREG-RSP message includes paging information. Here, a procedure for the M2M device to enter the idle mode may be initiated upon request of the base station. In this case, the base station transmits a DREG-RSP message to the M2M device.

The paging information may include a paging cycle, a paging offset, a Paging Group IDentifier (PGID), and a paging listening interval value.

Here, the paging cycle may have values as shown in the following Table 15.

TABLE 15

| Field | Size (bits) | Value/Description | Conditions |
|---|---|---|---|
| Paging cycle | 4 | Used to indicate Paging cycle for the AMS<br>0x00: 4 superframes<br>0x01: 8 superframes | Values 0x08-0x10 may be applied to M2M devices only. |

TABLE 15-continued

| Field | Size (bits) | Value/Description | Conditions |
|---|---|---|---|
| | | 0x02: 16 superframes | |
| | | 0x03: 32 superframes | |
| | | 0x04: 64 superframes | |
| | | 0x05: 128 superframes | |
| | | 0x06: 256 superframes | |
| | | 0x07: 512 superframes | |
| | | 0x08: 32768 superframes | |
| | | 0x09: 262144 superframes | |
| | | 0x10: 4194304 superframes | |
| | | 0x11-0x15: reserved | |

Two paging offsets may be allocated to the M2M device to increase reliability of reception of a paging message by the M2M device having a long paging cycle.

The two paging offsets may be represented as shown in the following Table 16.

TABLE 16

| Paging offset | 12 | Used to indicate Paging offset for the AMS. Determines the superframe within the paging cycle from which the paging listening interval starts. Shall be smaller than Paging cycle value. | |
|---|---|---|---|
| M2M paging offset | 10 | Used to indicate the superframe within the paging cycle at which the M2M device's paging listening interval starts. The superframe is determined by concatenating the M2M paging offset field and the Paging offset field. M2M paging offset shall be interpreted as the MSB. Shall be smaller than Paging cycle value. | May be present when the paging cycle value is set to 0x08, 0x09, or 0x10 |

As shown in Table 16, when the M2M device has failed to receive an AAI-PAG-ADV message at a first paging offset, the M2M device needs to perform monitoring to determine whether or not an AAI-PAG-ADV message is received at a second paging offset.

When the base station has not received a response from the M2M device after transmitting an AAI-PAG-ADV message in a network reentry process during the period of the first paging offset, the base station may request the M2M device of the second paging offset to perform re-paging in order to indicate an AAI-DREG-message.

When the M2M device has received a DREG-RSP message from the base station, the M2M device enters an idle mode with reference to the paging information. The idle mode may include a paging cycle(s), each of which may include an available interval and an unavailable interval. Here, the available interval is conceptually identical to the paging listening interval or the paging interval. The paging offset is used to indicate a time point (for example, a start or subframe) at which the paging interval starts in the paging cycle. The paging group identifier indicates an identifier of the paging group allocated to the M2M device. The paging information may include paging message offset information. The paging message offset information indicates a time point at which a paging message is transmitted from the base station. Thereafter, the M2M device may receive a paging message destined for the M2M device within an available interval (or paging listening interval) using the paging information. Here, the paging message may be transmitted through the base station or the paging controller. That is, the M2M device monitors a wireless channel according to the paging cycle in order to receive the paging message.

When the M2M device is in an idle mode, the M2M device receives a paging message within a paging listening interval for the M2M device to determine whether or not downlink data destined for the M2M device is present. If downlink data for the M2M device is present (i.e., when the paging message includes a positive indication), the M2M device performs a network reentry procedure including a ranging process. Thereafter, a procedure for establishing a connection for an associated downlink service flow is performed through a Dynamic Service Addition (DSA) procedure. After the connection for the service flow is established, the base station transmits downlink data for the service to the M2M device.

On the other hand, when the M2M device is in an idle state, the M2M device may transmit an abnormal power down report. The following is a description of a specific method for an M2M device to transmit an abnormal power down report in an idle mode.

First, when the base station has received a ranging preamble code, the base station may incorporate a CDMA allocation A-MAP IE into a next frame identifying the M2M device and provide a sufficiently large resource allocation to the M2M device to allow the M2M device to transmit an AAI-RNG-REQ message including a ranging purpose indication and CMAC tuple.

Here, the M2M device may not retransmit a ranging preamble code unless the following condition is satisfied.

That is, the M2M device may not retransmit a ranging preamble code except when the M2M device has not received an AAI-RNG-ACK message in response to the ranging preamble code transmitted by the M2M device and an opportunity selected by the M2M device after the M2M device transmitted the ranging preamble code or except when the M2M device has not received a CDMA allocation A-MAP IE before a T31 timer expires.

In addition, the M2M device may retransmit the ranging preamble code when the M2M device has not received a CDMA allocation A-MAP IE before the T3 timer expires after receiving an successful state indication.

When the M2M device has received the allocation, the M2M device transmits an AAI-RNG-REQ message including a valid CMAC tuple and a ranging purpose indication having a value of 0b1110 (indicating power outage) to the base station.

When the M2M device transmits the AAI-RNG-REQ message to the base station, the M2M device starts the T3 timer.

The AAI-RNG-REQ message that can be applied to this method may have a format as shown in the following Table 17.

TABLE 17

| Field | Size (bits) | Value/Description | Conditions |
|---|---|---|---|
| }-else if (Ranging Purpose Indication == 0b1110){ if (S-SFH Network Configuration bit == 0b1 or AMSID privacy is disabled) { AMS MAC address } else{ | 48 | //Abnormal or involuntary power down<br><br><br>AMS's real MAC address | |
| Deregistration Identifier (DID) | 18 | The ID that the AMS is assigned for idle mode and currently maintains. | If the Localized_Idle_Mode flag is set to 1 in AAI-DREG-REQ/RSP message, DID shall not be included in this message. |
| Fixed M2M Deregistration ID (FMDID) } | 16 | Used to indicate Fixed M2M Deregistration ID used to identify the fixed M2M device in idle mode 0 . . . 216-1 | Only present if the Localized_Idle_Mode flag is set to 1 in AAI-DREG-REQ/RSP message. |
| Paging Controller ID | 48 | The Paging Controller ID that the AMS currently maintains in idle mode. | If the Localized_Idle_Mode flag is set to 1 in AAI-DREG-REQ/RSP message, Paging Controller ID shall not be included in this message. |
| }//end of Ranging Purpose Indication | | | |

The format of the AAI-RNG-REQ message shown in Table 17 is merely an example and it is apparent that the present invention is not limited to this example and other formats may be applied.

The abnormal power down report procedure is terminated when the AAI-RNG-RSP message is received.

For example, when the M2M device has failed to receive the AAI-RNG-RSP message before the T3 timer expires, the M2M device again performs the abnormal power down report procedure.

Accordingly, the base station needs to transmit an AAI-RNG-RSP to the M2M device in response to the received AAI-RNG-REQ message.

When a target base station determines that a received CMAC tuple is valid and provides an authenticating CMAC tuple in response to the received CMAC tuple, the target base station may transmit, as a response, an encrypted AAI-RNG-RSP message including a location update response which indicates that an abnormal power down report procedure has been successfully terminated.

As is apparent from the above description, according to the embodiments of the present invention, a terminal (M2M device) can efficiently transmit an abnormal power down report to a base station using uplink resources that have already been allocated to the terminal.

In addition, according to the embodiments of the present invention, the terminal can perform efficient communication using a timer for confirmation of the transmitted abnormal power down report.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

The method for allocating resources in a broadband wireless access system may be used in various wireless communication systems such as 3GPP LTE-A and IEEE 802.

What is claimed is:

1. A method for transmitting an abnormal power down report by a Machine to Machine (M2M) device in a wireless communication system, the method comprising:
 transmitting the abnormal power down report to a base station,
 wherein the abnormal power down report includes offset information for an identifier of the M2M device that transmits the abnormal power down report, and
 wherein when the identifier is shared with a plurality of M2M devices, the identifier of the M2M device is valid within a time interval indicated by the offset information and the offset information is unique for each of the plurality of M2M devices.

2. The method according to claim 1, further comprising:
 starting a first timer to wait for a confirmation signal of the abnormal power down report.

3. The method according to claim 2, further comprising:
 receiving the confirmation signal from the base station in response to the abnormal power down report; and
 stopping the first timer in response to the receiving of the confirmation signal.

4. The method according to claim 2, further comprising retransmitting the abnormal power down report to the base station when the M2M device does not receive the confirmation signal in response to the abnormal power down report from the base station before the first timer expires.

5. The method according to claim 2, further comprising, when the M2M device does not receive the confirmation signal in response to the abnormal power down report from the base station before the first timer expires:
   transmitting a Bandwidth Request (BR) preamble sequence and a first message to a base station; and
   starting a second timer to wait for confirmation of the first message,
   wherein the first message includes an identifier of the M2M device and a BR index indicating the abnormal power down report.

6. The method according to claim 5, further comprising:
   receiving acknowledgement (ACK) information from the base station in response to the first message; and
   stopping the second timer in response to the receiving of the ACK information.

7. The method according to claim 6, further comprising retransmitting the BR preamble sequence and the first message to the base station when the M2M device does not receive the ACK information from the base station before the second timer expires.

8. A Machine to Machine (M2M) device for transmitting an abnormal power down report in a wireless communication system, the M2M device comprising:
   a radio frequency (RF) unit; and
   a processor configured to transmit the abnormal power down report via the RF unit to a base station,
   wherein the abnormal power down report includes offset information for an identifier of the M2M device that transmits the abnormal power down report, and
   wherein when the identifier is shared with a plurality of M2M devices, the identifier of the M2M device is valid within a time interval indicated by the offset information and the offset information is unique for each of the plurality of M2M devices.

9. The M2M device according to claim 8, wherein the processor is further configured to start a first timer to wait for a confirmation signal of the abnormal power down report.

10. The M2M device according to claim 9, wherein the processor is further configured to receive the confirmation signal from the base station in response to the abnormal power down report, and stop the first timer in response to the receiving of the confirmation signal.

11. The M2M device according to claim 9, wherein the processor is further configured to retransmit the abnormal power down report to the base station when the M2M device does not receive the confirmation signal in response to the abnormal power down report from the base station before the first timer expires.

12. The M2M device according to claim 9, wherein when the M2M device does not receive the confirmation signal in response to the abnormal power down report from the base station before the first timer expires, the processor is further configured to transmit a Bandwidth Request (BR) preamble sequence and a first message to a base station, and start a second timer to wait for confirmation of the first message,
   wherein the first message includes an identifier of the M2M device and a BR index indicating the abnormal power down report.

13. The M2M device according to claim 12, wherein the processor is further configured to receive acknowledgement (ACK) information from the base station in response to the first message, and stop the second timer in response to the receiving of the ACK information.

14. The M2M device according to claim 13, wherein the processor is further configured to retransmit the BR preamble sequence and the first message to the base station when the M2M device does not receive the ACK information from the base station before the second timer expires.

* * * * *